Patented Apr. 28, 1942

2,280,862

UNITED STATES PATENT OFFICE 2,280,862

COATING COMPOSITION AND METHOD OF PREPARATION

Ben Edmund Sorenson, Upper Darby, Pa., assignor to E. I. du Pont de Nemours & Company, Wilmington, Del., a corporation of Delaware No Drawing. Application May 17, 1940, Serial No. 335,787

19 Claims. (Cl. 260—405)

This invention relates to interpolymers of a resinous type and more particularly to resinous interpolymers of maleic acid esters of unsaturated alcohols and drying oils or semi-drying oils.

Maleic acid and some of its derivatives are known to react with drying oils having conjugated double bonds, e. g. China-wood oil and oiticica oil yielding Diels-Alder type compounds. These addition reactions take place at rather low temperatures and the reaction of maleic anhydride with oils constitutes a means for the determination of the amount of conjugation in drying oils.

I have found that maleic acid esters of unsaturated alcohols such as diallyl and dimethallyl maleates may be reacted under suitable conditions with drying and semi-drying oils containing very little conjugated unsaturation. Thus linseed oil or soya bean oil may be reacted with the unsaturated esters at a rather high temperature to yield resinous products or modified oils depending on the ratio of oil to ester used in the reaction.

This invention has as a principal object the provision of means for preparing resinous products from maleic acid esters of unsaturated alcohols and fatty oils which are substantially free of conjugated double bonds. A further object is the provision of a method for preparing modified oils. Another object is to prepare resinous products or modified oils as vehicles for decorative and protective coating compositions. Another object is the preparation of a new type of decorative and protective coating composition for use as enamels. Other objects will be apparent as the description of the invention proceeds.

These and related objects are accomplished by reacting at elevated temperatures under reflux conditions, fatty oils containing little no conjugation (or being substantially free of conjugated double bonds) and maleic acid esters of unsaturated alcohols as diallyl and dimethallyl maleates.

The invention will be more readily understood by the following examples which are given by way of illustration but not limitation. The parts are by weight.

Example I

| | Parts |
|---|---|
| Diallyl maleate | 300 |
| Linseed oil | 200 |
| High solvency petroleum naphtha | 217 |

The diallyl maleate and the linseed oil are placed in a three necked flask (which is equipped with a reflux condenser, a stirrer and a thermometer), and heated to a temperature of 250° C. The reaction mass is maintained at this temperature until a sample removed from the flask shows a viscosity of Z-6 (Gardner-Holdt scale). To reach this viscosity requires about 1¼ hours heating at the temperature noted above. After the resinous mass has cooled somewhat the high solvency petroleum naphtha is added and the refluxing continued at approximately 170° C. for a time sufficient to have the refluxing mass reach a viscosity of Z on the Gardner-Holdt scale. The time required for the resinous product to reach the desired viscosity is approximately from 6 to 8 hours.

The completed resin solution possesses the following constants:

| | |
|---|---|
| Viscosity (Gardner-Holdt scale) | Z |
| Color (Gardner-Holdt scale) | 2.5 |
| Solids percent | 57.2 |

The resin solids as determined are lower than the calculated solids due to unavoidable loss of some of the unpolymerized (or uncombined) diallyl maleate by volatilization during the solids determination.

A flow-out on a metal panel of the resin solution, containing 0.05% cobalt drier, dries to a slightly tacky film in approximately 12 hours. A similar flow-out on a metal panel of the resin solution, with or without the metallic drier, forms a hard, tough and durable film when baked at 200–260° F. (93–127° C.) for 1½ hours.

Example II

| | Parts |
|---|---|
| Diallyl maleate | 125 |
| Linseed oil | 375 |
| High solvency petroleum naphtha | 215 |

The diallyl maleate and the linseed oil were heated in the apparatus and according to the procedure described in Example I at 250° C. until a sample withdrawn from the flask and diluted to 80% solids with high solvency petroleum naphtha had a viscosity of X on the Gardner-Holdt scale. The time required to reach this viscosity may vary from 6 to 8 hours. The high solvency petroleum naphtha was then added to the resin in the flask. Constants determined on the resin solution showed:

| | |
|---|---|
| Viscosity (Gardner-Holdt scale) | Q |
| Color (Gardner-Holdt scale) | 3 |
| Solids per cent | 69.8 |

The resin solution to which has been added .05 to 0.10% of cobalt drier solution dries in 3–4 hours to a slight tack at room temperature. It produces a completely dried film in 12 hours at room temperature. The resin solution baked to a tack-free stage in 1½ hours at 100° C.

Example III

| | Parts |
|---|---|
| Diallyl maleate | 75 |
| Linseed oil | 425 |

The above materials were heated according to the procedure described under Example I—the temperature, however, being 260–265° C., until a sample withdrawn from the reaction container had a viscosity of Z–4 on the Gardner-Holdt scale. The time of heating required to reach this viscosity was approximately 10 hours.

The constants on the final resin were:

| | |
|---|---|
| Viscosity (Gardner-Holdt scale) | Z4–Z6 |
| Color (Gardner-Holdt scale) | 3 |

The resin when thinned with high solvency petroleum naphtha, to which was added .05% cobalt drier solution, air dried to a slightly tacky film in approximately 8 hours. This is comparable to the drying of a bodied drying oil. The film was completely dried and hard in 18–24 hours. A coating of the resin containing the drier baked to a tack-free film in 1 hour at 100° C. The film resembled that of a baked bodied oil.

Example IV

| | Parts |
|---|---|
| Diallyl maleate | 125 |
| Soya bean oil | 375 |
| Turpentine substitute | 215 |

The diallyl maleate and the soya bean oil are heated to 260° C. according to the procedure described in Example I, the heating being continued until a viscosity of Z6 (Gardner-Holdt scale) is reached. The turpentine substitute is then added to the reacted mass. The time of heating at 260° C. required to reach the desired reaction is from 10 to 12 hours.

The physical constants of the finished product were:

| | |
|---|---|
| Viscosity (Gardner-Holdt scale) | U |
| Color (Gardner-Holdt scale) | 2.5 |
| Solids per cent | 70 |

The resin solution when further diluted and treated with cobalt drier produces a film which air dries at room temperature in from 8–10 hours but is somewhat tacky. When baked at 200° F. for one hour the resin solution forms a spongy film which resembles that obtained from a bodied oil.

Example V

| | Parts |
|---|---|
| Dimethallyl maleate | 150 |
| Soya bean oil | 450 |

The reactants were heated according to the procedure previously described, the temperature being maintained at 260° C. until a sample removed from the reaction vessel had a viscosity of H on the Gardner-Holdt scale. The time required to reach this viscosity is approximately 2½ hours. The final constants of the modified oil were:

| | |
|---|---|
| Viscosity (Gardner-Holdt scale) | H |
| Color (Gardner-Holdt scale) | 2.5 |

Example VI

| | Parts |
|---|---|
| Dimethallyl maleate | 210 |
| Soya bean oil | 290 |

The materials were reacted at 260° C. according to the procedure previously described until a sample removed from the reaction mass had a viscosity of 0 on the Gardner-Holdt scale. The time required to reach this viscosity was between 2 and 3 hours. The modified oil possessed a final viscosity of 0 and a color of 2.5 on the Gardner-Holdt scale.

Example VII

| | Parts |
|---|---|
| Dimethallyl maleate | 869 |
| Linseed oil | 1,611 |

The reaction was carried out at 260° C. as previously described until a viscosity of R on the Gardner-Holdt scale was reached. The time required for the desired reaction was between 2 and 3 hours. The modified oil had a final viscosity of R and a color of 2.5 on the Gardner-Holdt scale.

The low viscosity products of Examples V, VI and VII and the following Example VIII are particularly useful in the preparation of varnishes. They are also useful in the preparation of copolymerization products with such other polymerizable materials as e. g. styrene.

Example VIII

| | Parts |
|---|---|
| Dimethallyl maleate | 750 |
| Linseed oil | 2,250 |

The materials were reacted according to the procedure previously described (temperature 260° C.) until the product had a viscosity of I–J on the Gardner-Holdt scale. The final modified oil had a color of 3 on the Gardner-Holdt scale. Time required for the reaction was between 2 and 3 hours.

Example IX

| | Parts |
|---|---|
| Dimethallyl maleate | 240 |
| Dehydrated castor oil | 160 |
| Low flash solvent naphtha | 267 |
| Benzoyl peroxide | 1 |

The dimethallyl maleate and the dehydrated castor oil were heated in a three necked flask (equipped with a thermometer, a stirrer and a reflux condenser) and heated to 225° C. This temperature was maintained for from 6 to 8 hours. The low flash solvent naphtha was then added to the reacted mass and the whole then refluxed during which time the benzoyl peroxide was added portionwise until a sample withdrawn from the flask possessed a viscosity of I–J. The refluxing was continued until the reacting mass possessed a viscosity of R–T on the Gardner-Holdt scale. The final resin solution showed physical constants as follows:

| | |
|---|---|
| Viscosity (Gardner-Holdt scale) | S |
| Color | 2.5 |
| Solids per cent | 57.7 |

A flow-out of the resin solution on a metal panel does not air dry satisfactorily, the film being tacky after 18–24 hours.

A similar flow-out of the resin solution containing 0.01% cobalt drier based on the oil when baked at 225° F. (107° C.) produces a hard, tough and durable film. Without drier and baked at 260° F. (127° C.) the resin produces a similar film.

Example X

| | Parts |
|---|---|
| Dimethallyl maleate | 1,500 |
| Dehydrated castor oil | 500 |
| Low flash solvent naphtha | 1,330 |
| Benzoyl peroxide | 1 |

The dimethallyl maleate and the dehydrated castor oil were heated in a three necked flask (equipped with a thermometer, a stirrer and a reflux condenser) to 250° C. Air was excluded from the reaction mixture by blowing a small stream of inert gas (as $CO_2$) into the top of the condenser. The temperature of the reaction mixture was maintained at 250° C. until a sample removed from the flask and diluted with low flash solvent naphtha had a viscosity of E. The time required to reach this viscosity was approximately 1½ hours. The reaction mixture was allowed to cool to approximately 200° C. and the solvent naphtha then added. After this dilution one-half of the benzoyl peroxide was added and the mass refluxed for approximately 1½ hours. At this point the remainder of the benzoyl peroxide was added and the refluxing continued until a sample removed from the flask had a viscosity of K. The time of heating required to reach this viscosity after dilution was approximately 5 hours. The resin solution thus obtained was stabilized by adding .01% of hydroquinone (based on the resin solids) as a 2% solution in isobutanol.

The finished resin solution possessed the following constants:

| | |
|---|---|
| Viscosity | L |
| Color | 1 |
| Solids content per cent | 57 |

When applied to a suitable metal surface the resin solution does not air dry satisfactorily in 24 hours. However, when the resin solution containing 0.01% cobalt drier (based on the oil) is applied to a suitable metal base and baked at 200° F. (93° C.) for 1½ hours it produces a hard, tough and durable film. The resin solution containing no drier produces hard, tough and durable films when baked for 2 hours at 260° F. (127° C.).

The diallyl and dimethallyl maleates may be conveniently prepared according to the procedure described in my co-pending application Serial No. 335,790, filed May 17, 1940, by reacting an alkyl maleate with allyl or methallyl alcohol in the presence of metallic aluminum as a catalyst. The esters prepared in any other suitable manner may also be used.

Various fatty oils may be used in the reaction with maleic acid esters of the unsaturated alcohols being of the type as contain little or no conjugation or being substantially free of conjugated double bonds.

Products of varying ratio of oil to ester may be prepared as will be apparent from the examples. Linseed oil reacts with dimethallyl maleate in all proportions. With soya bean oil it is preferable to have the dimethallyl maleate constitute less than 40-50% of the total in order to produce a homogeneous resin. Linseed oil is compatible with diallyl maleate in proportions up to 60% of the latter, while soya bean oil and diallyl maleate are compatible up to approximately 40% of the maleate ester. Dehydrated castor oil is compatible in all proportions with dimethallyl maleate.

The products of the invention containing the higher percentages of the maleate ester yield films which air dry rather slowly but bake readily to hard and tough films. Products with the lower ester content yield oil like films which air dry satisfactorily. These modified oils may be used in preparing varnishes and resins. The modified oils containing from 15-35% of maleic acid esters of the unsaturated alcohols may be used in the preparation of varnishes with ester gums. Varnishes having a heavier body may be prepared from such modified oils in a shorter cooking time than when unmodified oils are used. The modified oils may also be copolymerized with other polymerizable materials as e. g. styrene to yield homogeneous resins.

For the preparation of decorative and protective coating compositions the products of the invention may be suitably combined with pigments, fillers, dyestuffs, etc., commonly used in the art or mixed with other suitable film forming materials.

It will be apparent from the description of the invention that means have been provided for preparing a new type of vehicle for use in preparing decorative and protective coating compositions of various kinds which possess new and useful properties and represent an advance in the art.

It is apparent that many widely different embodiments of this invention may be made without departing from the spirit and scope thereof, and therefore it is not intended to be limited except as indicated in the appended claims.

I claim:

1. The process of preparing modified oils and resinous materials which comprises refluxing fatty unsaturated, non-hydroxylated oils containing substantially no conjugation and maleic acid esters of unsaturated alcohols.

2. The process of claim 1 in which the unsaturated alcohol is diallyl alcohol.

3. The process of claim 1 in which the ester is dimethallyl maleate.

4. The process of claim 1 in which the oil is linseed oil.

5. The process of claim 1 in which the oil is soya bean oil.

6. The process of claim 1 in which the oil is dehydrated castor oil.

7. The process of preparing modified oils and resinous materials which comprises refluxing diallyl maleate and a fatty unsaturated, non-hydroxylated oil containing substantially no conjugation at a temperature of about 250° C. until a sample has a viscosity of Z-6 on the Gardner-Holdt scale.

8. The process of preparing modified oils and resinous materials which comprises refluxing diallyl maleate and a fatty unsaturated, non-hydroxylated oil containing substantially no conjugation at a temperature of about 250° C. until a sample has a viscosity of Z on the Gardner-Holdt scale.

9. The process of claim 7 in which the diallyl maleate is present in amount less than 40% of the mixture.

10. The process of claim 8 in which the diallyl maleate is present in amount less than 40% of the mixture.

11. As a new article of manufacture the reaction product of a modified fatty unsaturated, non-hydroxylated oil having substantially no conjugation and an ester of maleic acid and an unsaturated alcohol.

12. The product of claim 11 in which the ester is diallyl maleate.

13. The product of claim 11 in which the ester is dimethallyl maleate.

14. The product of claim 11 in which the oil is linseed oil.

15. The product of claim 11 in which the oil is dehydrated castor oil.

16. The product of claim 11 in which the oil is soya bean oil.

17. The product of claim 11 in which the modified oils contain from 15 to 35% of the maleic acid ester.

18. The process of claim 1 in which the oil is linseed oil and the ester dimethallyl maleate.

19. The product of claim 11 in which the oil is linseed oil and the ester is dimethallyl maleate.

BEN EDMUND SORENSON.